United States Patent [19]

Hegner et al.

[11] Patent Number: 5,877,424
[45] Date of Patent: Mar. 2, 1999

[54] CAPACITIVE PRESSURE MEASURING ARRANGEMENT HAVING PROTECTION AGAINST INTERFERENCE SIGNALS

[76] Inventors: Frank Hegner, Chrischonastrasse 41, D-79540 Lörrach; Lukas Klausmann, Lettenweg 20a, D-79539 Lörrach, both of Germany

[21] Appl. No.: 748,358

[22] Filed: Nov. 13, 1996

[30] Foreign Application Priority Data

Dec. 22, 1995 [EP] European Pat. Off. .............. 95120452

[51] Int. Cl.⁶ ....................................................... G01L 9/12
[52] U.S. Cl. ............................ 73/724; 73/756; 361/283.4
[58] Field of Search ............................ 361/283.4; 73/718, 73/724, 756

[56] References Cited

U.S. PATENT DOCUMENTS

| 3,948,102 | 4/1976 | Coon ........................................... 73/724 |
| 4,413,527 | 11/1983 | Sugiura et al. . |
| 5,001,595 | 3/1991 | Dittrich et al. . |
| 5,005,421 | 4/1991 | Hegner et al. . |
| 5,050,034 | 9/1991 | Hegner et al. . |
| 5,050,035 | 9/1991 | Hegner et al. . |
| 5,194,697 | 3/1993 | Hegner et al. . |
| 5,210,501 | 5/1993 | Schneider et al. . |
| 5,257,210 | 10/1993 | Schneider et al. . |
| 5,451,940 | 9/1995 | Schneider et al. . |

FOREIGN PATENT DOCUMENTS 2 707 002  12/1994  France .
4-102036   4/1992   Japan .

OTHER PUBLICATIONS

Endress + Hauser, "Pressure Transmitter—cerabar PMC 133", Technical Information Brochure, pp. 1–8, date unknown.

Primary Examiner—Joseph L. Felber
Attorney, Agent, or Firm—Bose McKinney & Evans

[57] ABSTRACT

This pressure measuring arrangement (10), which is both proof against the coupling-in of interference signals and satisfies the specifications relating to explosion protection, comprises a capacitive, ceramic pressure sensor (11) which has a substrate (12) having at least one electrode applied thereto and an associated diaphragm (13) having a counter-electrode applied thereto. Electrical contact can be made with the electrode and counter-electrode at the rear side (121) of the substrate, on which rear side is arranged a converter circuit (14) for capacitance changes which are caused by pressure changes. A current output circuit (17) is arranged inside the metallic housing (15) having a wall (151), a bottom (152) and an opening (153) which is situated opposite to the latter and into which the pressure sensor (11) is inserted in a pressure-tight manner, which current output circuit converts an output signal of the converter circuit (14) into a direct current which is proportional to the capacitance change and flows in two output lines (18, 19) which pass in an insulated manner through the bottom (152). A shielding electrode (20) which is arranged inside the housing (15) in an insulated manner with respect to the wall (151) is coupled at low impedance to one of the two output lines. The interior of the housing (15) is completely filled with a potting compound (25).

7 Claims, 1 Drawing Sheet

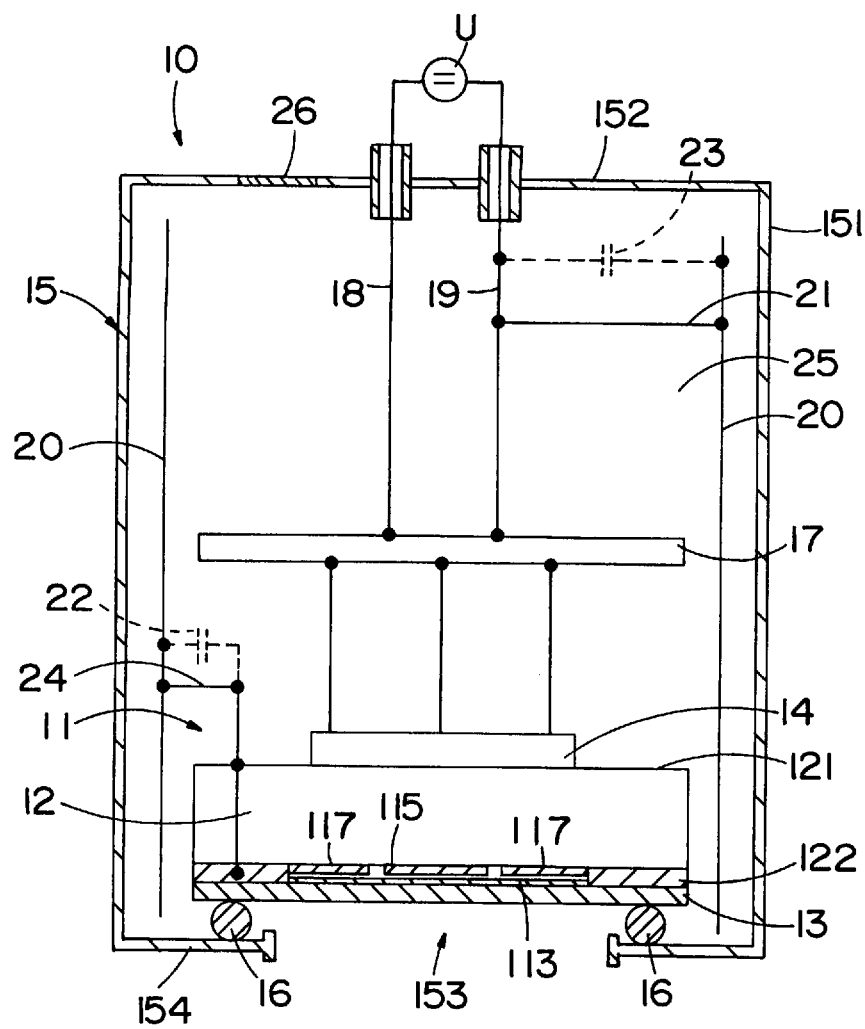

/ 5,877,424 /

CAPACITIVE PRESSURE MEASURING ARRANGEMENT HAVING PROTECTION AGAINST INTERFERENCE SIGNALS

FIELD OF THE INVENTION

The invention relates to a pressure measuring arrangement having a capacitive, ceramic pressure sensor.

BACKGROUND OF THE INVENTION

A brochure from the company Endress+Hauser "Pressure Transmitter cerabar PMC 133", Maulburg, Germany, TI 105P/00/e/02.94 describes a pressure measuring arrangement comprising:

a capacitive, ceramic pressure sensor, which has a substrate having at least one electrode applied thereto and an associated diaphragm having a counter-electrode applied thereto,
it being possible to make electrical contact with said electrode and said counter-electrode at a rear side of the substrate,
on which rear side is arranged a converter circuit for capacitance changes between the electrode and counter-electrode which are caused by pressure changes, a metallic housing having a wall, a removable cover, an intermediate bottom and an opening situated opposite to the latter,
into which opening the pressure sensor is inserted in a pressure-tight manner, a current output circuit arranged inside the housing, between the intermediate bottom and the pressure sensor,
which current output circuit converts an output signal of the converter circuit into a direct current which is proportional to the capacitance change, flows in two output lines leading to a pair of terminals arranged in the intermediate bottom and has a current intensity of between 4 mA and 20 mA, and a cable bushing for a cable leading to the pair of terminals.

With respect to this previously described pressure measuring arrangement, one object of the invention is to further improve the protection against the coupling-in of interference signals, in other words the so-called electromagnetic compatibility, and furthermore to facilitate compliance with standards which ensure explosion protection.

In order to achieve this object, the invention consists in a pressure measuring arrangement comprising:

a capacitive, ceramic pressure sensor, which has a substrate having at least one electrode applied thereto and an associated diaphragm having a counterelectrode applied thereto,
it being possible to make electrical contact with said electrode and said counter-electrode at a rear side of the substrate,
on which rear side is arranged a converter circuit for capacitance changes between the electrode and counter-electrode which are caused by pressure changes, a pot-shaped metallic housing having a wall, a bottom and an opening situated opposite to the latter,
into which opening the pressure sensor is inserted in a pressure-tight manner, a current output circuit arranged inside the housing,
which current output circuit converts an output signal of the converter circuit into a direct current which is proportional to the capacitance change and flows in two output lines which pass in an insulated manner through the bottom of the housing, a shielding electrode which is arranged inside the housing in an insulated manner with respect to the wall and is coupled at low impedance to one of the two output lines and
to the counter-electrode, and a potting compound, with which the interior of the housing is completely filled.

According to a preferred embodiment of the invention, a metal-coated plastic film serves as shielding electrode. In another preferred embodiment, the current output circuit generates a direct current having a current intensity of between 4 mA and 20 mA.

In a further preferred embodiment, the one output line and the counter-electrode are each electrically conductively connected to the shielding electrode.

In a further preferred embodiment, the one output line is electrically conductively connected to the shielding electrode and the counter-electrode is capacitively connected to the shielding electrode via a capacitor which is dimensioned in such a way that its capacitance represents the best possible short circuit for frequencies occurring in interference signals.

In a further preferred embodiment, the counter-electrode is electrically conductively connected to the shielding electrode and the one output line is capacitively connected to the shielding electrode via a capacitor which is dimensioned in such a way that its capacitance represents the best possible short circuit for frequencies occurring in interference signals.

Finally, in a further embodiment, the one output line and the counter-electrode are connected to the shielding electrode via a respective capacitor which is dimensioned in such a way that its respective capacitance represents the best possible short circuit for frequencies occurring in interference signals.

A first advantage of the invention consists in the fact that interference signals which are coupled in during the operation of the pressure measuring arrangement via two external connection lines, which are respectively connected to an output line, of a cable, in other words cable-conducted interference, are diverted to the housing by means of the low-impedance coupling, in particular electrically conductive or capacitive connection, of the one output line to the shielding electrode via the capacitor which is formed by the latter and the wall of the housing and has the potting compound as a dielectric, without it being possible for interference fields belonging to the interference signals to penetrate into the interior of the housing from the bottom.

A second advantage of the invention consists in the fact that interference signals which are captured by the counter-electrode are likewise diverted to the wall of the housing by means of the low-impedance coupling, in particular electrically conductive or capacitive connection, between the counter-electrode on the diaphragm of the pressure sensor and the shielding electrode, and, consequently, it is also not possible for any interference fields to penetrate into the interior of the housing from the opening in the latter.

A further advantage of the invention is to be seen in the fact that the potting compound makes it possible to comply with minimum lengths, prescribed in explosion protection standards, of creepage paths between parts which are at different potentials in the operating state. This relates particularly to those points where there is only a small distance between the counter-electrode of the diaphragm and the housing.

BRIEF DESCRIPTION OF THE DRAWINGS

The invention is now explained in more detail with reference to the drawing, in the single figure of which an embodiment is shown diagrammatically in section.

DETAILED DESCRIPTION OF THE DRAWINGS

The single figure shows a pressure measuring arrangement 10 which contains a capacitive, ceramic pressure sensor 11 as a mechanical-electrical transducer for converting pressure changes into electrical signal changes.

The pressure sensor 11 has a substrate 12 having e.g. a first electrode 115 and a second electrode 117 which are applied to one of the main sides of said substrate. The pressure sensor 11 furthermore has a diaphragm 13 having a counter-electrode 113 applied thereto. At the respective edge, the substrate and diaphragm are permanently joined together in a pressure-tight manner with the interposition of a formed part which brings about a mutual separation and is made, for example, of an active brazing alloy, a chamber consequently being produced in the pressure sensor.

The substrate electrodes 115, 117 and the counter-electrode 113 are thus situated opposite one another in the interior of the pressure sensor and therefore in each case form a capacitor. These two capacitors consequently have the counter-electrode as a common electrode. When the diaphragm 13 is exposed to pressure changes, it moves to and fro and consequently changes the respective capacitance of the capacitors. The electrodes and counter-electrode are conducted to a rear side 121 of the substrate 12, where electrical contact can be made with them.

A converter circuit 14 for the capacitance changes which are caused by pressure changes is arranged on this rear side and can be designed, for example, in the form of a so-called hybrid circuit, that is to say monolithically integrated parts and discrete components are structurally and electrically combined on a common substrate. Circuit arrangements of the kind described, for example, in the U.S. Pat. No. 5,210,501, 5,257,210 or 5,451,940 can be used for the converter circuit 14.

The pressure measuring arrangement 10 furthermore contains a pot-shaped metallic housing 15 having a wall 151, a bottom 152 and an opening 153 which is situated opposite to the latter and into which the pressure sensor 11 is inserted in a pressure-tight manner, for example by means of an annular seal 16. The latter is supported on the inside of the housing 15, on a drawn-in edge 154 of said housing.

A current output circuit 17 is furthermore arranged inside the housing 15, which current output circuit converts an output voltage of the converter circuit 14 into a direct current which is proportional to the capacitance changes of the pressure sensor 11. This direct current flows in two output lines 18, 19, which pass in an insulated manner through the bottom 152 of the housing 15, when an external voltage source U is connected via supply lines to the output lines during the operation of the pressure measuring arrangement. The current intensity of the direct current is preferably between 4 mA and 20 mA.

A shielding electrode 20 is arranged, virtually along the entire area of the wall 151, inside the housing 15 in an insulated manner with respect to the wall 151. The shielding electrode 20 can preferably consist of a plastic film coated with a suitable metal, for example copper.

One of the two output lines, the output line 19 in the figure, is electrically conductively or capacitively connected to the shielding electrode 20, cf. the connecting line 21 or the capacitor 23, respectively. Furthermore, the counter-electrode of the diaphragm 13 is electrically conductively or capacitively connected to the shielding electrode 20, cf. the connecting line 24 or the capacitor 22, respectively. The respective capacitor 22, 23 is preferably dimensioned in such a way that its respective capacitance represents the best possible short circuit for frequencies occurring in interference signals.

Since, on the one hand, the two output lines 18, 19 are generally routed in a common cable, and virtually only common-mode interference signals therefore occur on the two output lines, and since, on the other hand, the output lines are also connected, in the operating state of the pressure sensor, to a voltage source U which feeds the current output circuit 17 and via whose (small) internal resistance the output lines are in fact also connected to one another, it is possible to achieve the effect outlined whereby interference fields are not allowed to penetrate into the interior of the housing 15 from the bottom 152 solely by means of the low-impedance coupling of a single output line to the shielding electrode 20.

Finally, the interior of the housing 15 is completely filled with a potting compound 25, which is introduced through a filling opening 26 provided, for example, in the bottom 152 of the housing 15. After filling, said opening is closed off by the potting compound 25 itself, or it can be closed by means of a closure to be provided separately.

The advantages which have already been mentioned above are obtained by virtue of the structure portrayed. In particular, filling with the potting compound 25, which also makes its way into the interspace between the wall 151 and the shielding electrode 20, results in the formation of a capacitor whose capacitance is increased by the value of the relative dielectric constant of the potting compound 25 compared with a structure in which said compound is absent and, consequently, only air would be present in the above-mentioned interspace.

Furthermore, the potting compound 25 effects compliance with minimum lengths, prescribed in explosion protection standards, of creepage paths between parts which may be at different potentials. This relates, in particular, to those points where there is only a small distance between the counter-electrode 113 of the diaphragm 13 and the housing 15, that is to say in the figure, for example, between the molding 122 and the shielding electrode 20 on the left and right above the seal 16, to be precise for the case where the capacitor 22 is provided instead of the line 24.

Another effect of the potting compound 25 is that the shielding electrode 20 is mechanically permanently fixed, with the result that it cannot be displaced, not even slightly, if any movements, in particular mechanical vibrations, which would lead to a microphonic coupling of interference signals into the output line 19 act on the housing 15.

In addition, the potting compound 25 protects against the penetration, in particular creepage, of moisture and also increases the insensitivity of the pressure sensor to dirt.

We claim:

1. A pressure measuring arrangement, comprising:
   a capacitive, ceramic pressure sensor, which has a substrate having at least one electrode applied thereto and an associated diaphragm having a counter-electrode applied thereto,
   it being possible to make electrical contact with said electrode and said counter-electrode at a rear side of the substrate,
      on which rear side is arranged a converter circuit for capacitance changes between the electrode and counter-electrode which are caused by pressure changes, a pot-shaped metallic housing having a wall, a bottom and an opening situated opposite to the bottom,
  into which opening the pressure sensor is inserted in a pressure-tight manner,
a current output circuit arranged inside the housing,
  which current output circuit converts an output signal of the converter circuit into a direct current which is proportional to the capacitance change and flows in two output lines which pass in an insulated manner through the bottom of the housing,
a shielding electrode which
  is arranged inside the housing in an insulated manner with respect to the wall and is coupled at low impedance to one of the two output lines and to the counter-electrode, and
a potting compound, with which the interior of the housing is completely filled.

2. The pressure measuring arrangement as claimed in claim 1, having a metal-coated plastic film as the shielding electrode.

3. The pressure measuring arrangement as claimed in claim 1, where the current output circuit generates a current of 4 mA to 20 mA.

4. The pressure measuring arrangement as claimed in claim 1, having a respective electrically conductive connection between the one output line and the shielding electrode and between the counter-electrode the shielding electrode.

5. The pressure measuring arrangement as claimed in claim 1, having an electrically conductive connection between the one output line and the shielding electrode and having a capacitive connection between the counter-electrode and the shielding electrode via a capacitor.

6. The pressure measuring arrangement as claimed in claim 1, having an electrically conductive connection between the counter-electrode and the shielding electrode and having a capacitive connection between the one output line and the shielding electrode via a capacitor.

7. The pressure measuring arrangement as claimed in claim 1, having a respective capacitive connection between the one output line and the shielding electrode and between the counter-electrode and the shielding electrode via a respective capacitor.

* * * * *